Oct. 31, 1944.  G. W. GARMAN  2,361,846
ELECTRIC VALVE CIRCUIT
Filed Jan. 25, 1939  2 Sheets-Sheet 1
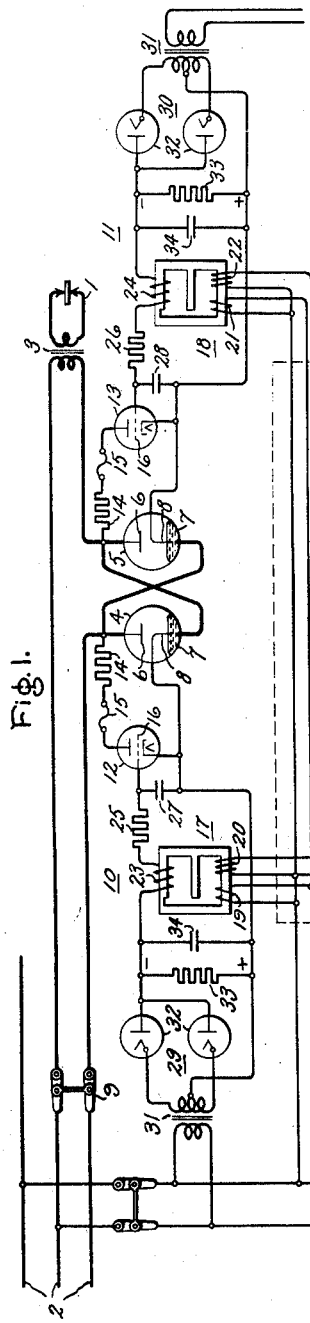
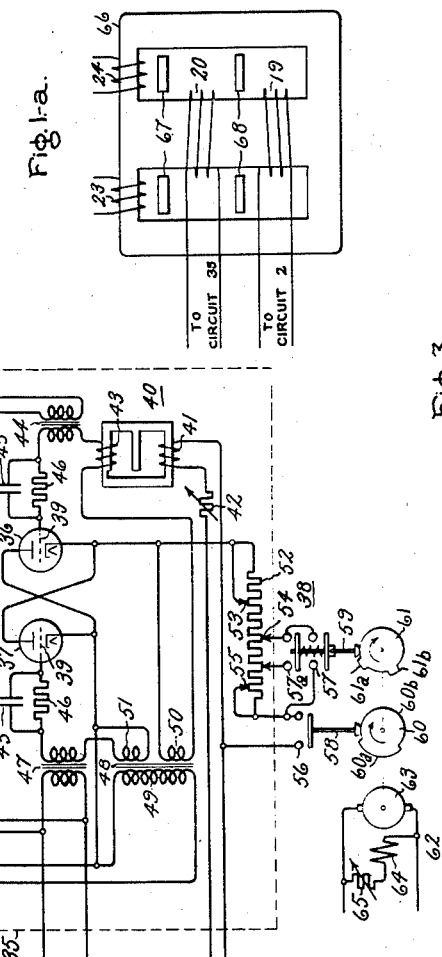
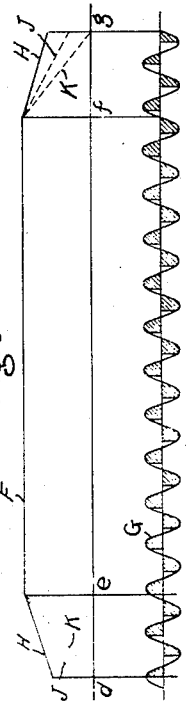
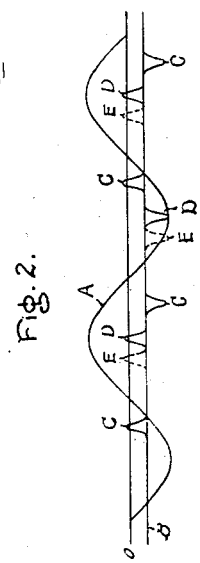
Inventor:
George W. Garman,
by Harry E. Dunham
His Attorney.

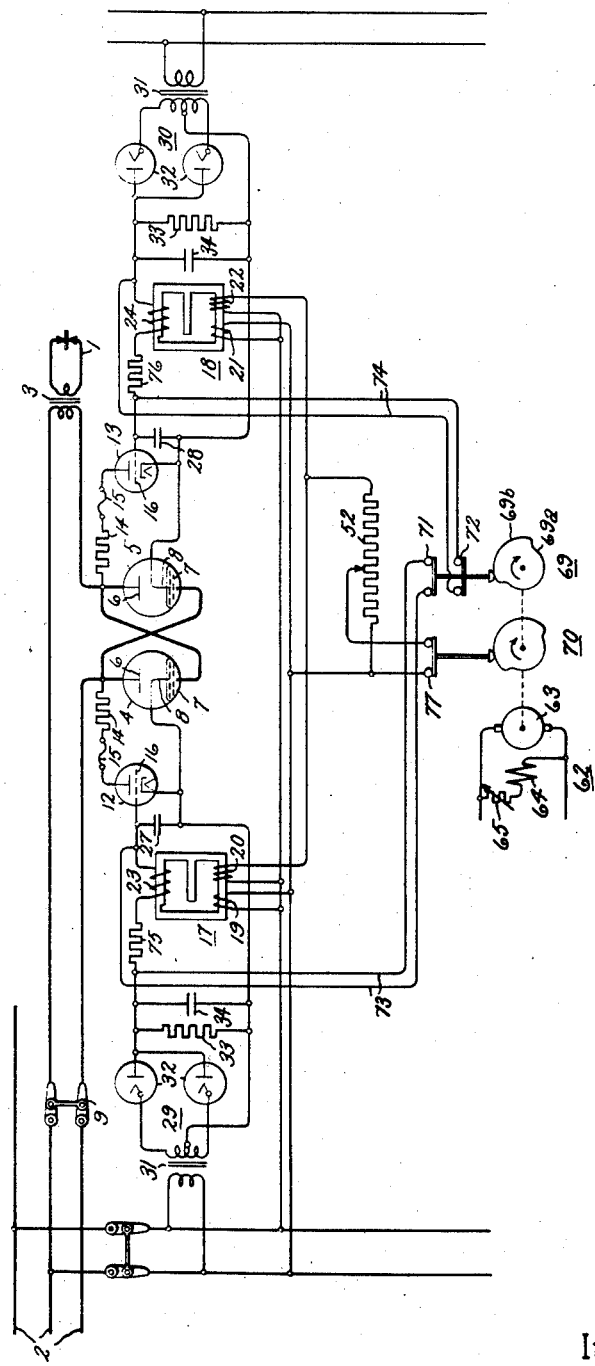

Patented Oct. 31, 1944

2,361,846

UNITED STATES PATENT OFFICE 2,361,846

ELECTRIC VALVE CIRCUITS

George W. Garman, Schenectady, N. Y., assignor to General Electric Company, a corporation of New York Application January 25, 1939, Serial No. 252,770

25 Claims. (Cl. 250—27)

My invention relates to electric valve circuits and more particularly to control systems for electric valve translating apparatus.

In the control of electric valve apparatus such as electric valve means utilizing an ionizable medium and having a control member for controlling the conductivity thereof, it has been found desirable to control the conductivity of the electric valve means by impressing on the control member periodic or alternating voltages of peaked wave form in order that the electric valve means may be rendered conductive precisely at a desired time during the cycles of voltage of an associated alternating current supply circuit. It is desirable in many arrangements to control the conductivity of the electric valve means to effect energization of the associated load circuit during an accurately determinable interval of time. In some welding applications it is extremely important that the value of the current transmitted to the load circuit be maintained within narrowly defined limits so that the work is not injured.

In accordance with the teachings of my invention described hereinafter, I provide new and improved control circuits whereby electric valve means are accurately controlled to effect energization of a load circuit during a definite interval of time, and in which the load current is maintained within narrowly defined limits.

It is an object of my invention to provide new and improved electric valve translating apparatus.

It is another object of my invention to provide new and improved control or excitation circuits to electric valve means.

It is a further object of my invention to provide new and improved control or excitation circuits for electric valve means whereby a lead circuit is energized intermittently and the current transmitted is varied during each energization.

In accordance with the illustrated embodiments of my invention, I provide new and improved control or excitation circuits for electric valve means which control the energization of a load circuit from an alternating current supply circuit. The electric valve means comprises a control member which controls the conductivity thereof and controls the energization of the load circuit. A saturable inductive device, such as a peaking transformer, impresses on the control member of the electric valve means an alternating voltage of peaked wave form. The saturable inductive device comprises a secondary winding which is connected to the control member and includes a pair of primary windings. One of the primary windings is connected permanently to the alternating current supply circuit, and the other primary winding is energized through a control circuit to initiate the period of energization of the load circuit and to control the magnetization of the inductive device to control the phase of the periodic voltage impressed on the control member and hence to control the amount or the root-mean-square value of alternating current transmitted to the load circuit during the interval of energization of the load circuit.

In one of the illustrated embodiments of my invention the control circuit comprises a pair of reversely connected electronic discharge means and a serially connected variable impedance means which effect energization of the load circuit at a desired time during the cycle of voltage of the alternating current circuit, and which control the energization of one of the primary windings to effect control of the phase of the periodic voltage to transmit different amounts of current to the load circuit during different portions of the interval of energization of the load circuit. For example, the phase of the periodic voltage may be advanced at the beginning of the period of energization to increase the current transmitted to the load circuit to a predetermined value and may be retarded near the end of the interval in order to decrease the current transmitted to the load circuit.

In another embodiment of my invention diagrammatically illustrated, the period of energization of the control circuit is determined by means of a circuit connected in shunt with the secondary winding of the saturable inductive device. The control of the phase of the periodic voltage is effected by variably energizing one of the primary windings.

My invention will be better understood from the following description taken in connection with the accompanying drawings, and its scope will be pointed out in the appended claims.

In the drawings, Fig. 1 diagrammatically illustrates an embodiment of my invention as applied to a welding circuit and Fig. 1a diagrammatically illustrates a modification of part of the control circuit shown in Fig. 1. Figs. 2 and 3 show certain operating characteristics of the arrangements shown in Figs. 1 and 1a, and Fig. 4 diagrammatically illustrates a further modification of the arrangement of the invention shown in Fig. 1.

Fig. 1 diagrammatically illustrates an embodiment of my invention as applied to an electric valve translating system for effecting energization of a load circuit, such as a welding circuit 1, from a suitable alternating current supply circuit 2 through a transformer 3 and main or power electric valve means 4 and 5. Electric valve means 4 and 5 are preferably of the type employing an ionizable medium, such as a gas or a vapor, and may be connected reversely in parallel in order to transmit alternating current to the welding circuit 1. Each of the electric valve means 4 and 5 may comprise an anode 6, a mercury pool cathode 7 and an associated control member 8 which may be of the make-alive or immersion-ignitor type constructed of a material having a relatively high electrical resistivity with respect to that of the associated mercury pool cathode. A switch 9 may be connected between the supply circuit 2 and the electric valve means 4 and 5.

I provide a control system for controlling the electric valve means 4 and 5 in order to effect energization of the welding circuit 1 during a predetermined interval of time and for controlling the electric valve means so that different amounts of current or different root-mean-square values of current are transmitted to the welding circuit 1 during different portions of the interval of energization of the welding circuit. More specifically, I provide a control circuit for controlling the electric valve means 4 and 5 in order that the current transmitted to the welding circuit 1 is of smaller magnitude at the beginning and at the end of the interval of energization than the value of current during the intermediate region of the interval. This type of control is of particular importance in some welding operations where it is desirable to obtain lower values of welding current at the beginning and at the end of the weld in order to prevent injury to the work. For example, in the welding of metal receptacles, it is desirable to taper the magnitude of the current at the beginning and at the end of the welding operation.

In order to control the electric valve means 4 and 5, I provide control or excitation circuits 10 and 11, respectively, which render the electric valve means 4 and 5 conductive during a predetermined interval of time corresponding to the desired interval of energization of the welding circuit 1 and which, in conjunction with a control circuit described hereinafter, controls the electric valve means 4 and 5 to transmit different amounts of current to the welding circuit 1 during different portions of the interval of energization. Excitation circuits 10 and 11 comprise control electric valve means 12 and 13 which are associated with electric valve means 4 and 5, respectively, and which are responsive to the anode voltages of the electric valve means 4 and 5. The control electric valve means 12 and 13 are connected between the anodes 6 and the immersion-ignitor control members 8 of the electric valve means 4 and 5, respectively, through current limiting resistances 14 and over-current protective devices, such as fuses 15. The control electric valve means 12 and 13 are preferably of the type employing an ionizable medium, such as a gas or a vapor and each comprises a control member 16 which renders the electric valve means conductive to effect energization of the associated immersion ignitor control member.

As a means for controlling the control electric valve means 12 and 13 and hence for controlling the conductivities of the main electric valve means 4 and 5, I provide saturable inductive devices 17 and 18 having primary windings 19, 20; 21, 22 and secondary windings 23 and 24, respectively. The saturable inductive devices 17 and 18 are designed and constructed to induce in the secondary windings 23 and 24 periodic voltages, such as alternating voltages of peaked wave form, to render the control electric valves 12 and 13 conductive at precisely determinable points during the cycles of voltage of circuit 2. Primary windings 20 and 22 are arranged to oppose the effect of primary windings 19 and 21, respectively, in order that the phase of the alternating voltages of peaked wave form produced by windings 23 and 24 may be shifted substantially to render selectively conductive and nonconductive the electric valve means 12 and 13. Primary windings 19 and 21 are continuously energized from the supply circuit 2 and are connected so that when primary windings 20 and 22 are deenergized, the alternating voltages produced by secondary windings 23 and 24 lead the anode-cathode voltages of electric valve means 12 and 13 by an angle which prevents the ignition of these electric valve means. When the primary windings 20 and 22 are energized, these windings overcome the effect of windings 19 and 21 to shift the phase of the alternating voltages of peaked wave form into that region in which the electric valve means 12 and 13 may be rendered conductive; that is, the voltages of peaked wave form are shifted into the positive half cycles of applied anode-cathode voltages.

Suitable current limiting resistances 25 and 26 may be connected in series relation with the secondary windings 23 and 24 of the saturable inductive devices 17 and 18, and capacitances 27 and 28 are connected between the control members and the cathodes of the control electric valves 12 and 13 in order to absorb extraneous transient voltages which may be present in the excitation circuits 10 and 11.

I provide suitable means for producing negative unidirectional biasing potentials, such as rectifying circuits 29 and 30, and which comprise a part of the excitation circuits 10 and 11 respectively. Each of the rectifying circuits 29 and 30 comprises a transformer 31 which may be energized from the alternating current circuit 2, a pair of unidirectional conducting devices 32, a resistance 33 through which there is transmitted a substantially constant amount of unidirectional current in order to produce across the terminals thereof a substantially constant unidirectional biasing potential, and a capacitance 34 which serves as a filtering means to smooth the voltage appearing across the terminals of the resistance 33.

I provide a control circuit 35 which, in conjunction with the excitation circuits 10 and 11, controls the electric valve means 4 and 5 to effect energization of the welding circuit 1 during a predetermined interval of time and which controls the electric valve means 4 and 5 so that different amounts of current are transmitted to the welding circuit 1 during different portions of the interval of energization of the welding circuit. More particularly, I provide means for controlling the saturable inductive devices 17 and 18 to impress on the control members 16 of the control electric valves 12 and 13 periodic voltages to render the electric valve means 4 and 5 conductive during each cycle of voltage of circuit 2 during a predetermined interval of time, and which varies the phase of the periodic voltages with respect to the voltage of circuit 2 in order to vary the magnitude of the current transmitted to the welding circuit 1 during the interval of energization of the welding circuit 1. The control circuit 35 comprise a pair of reversely connected electronic discharge means 36 and 37 which are connected to energize the primary windings 20 and 22 of saturable inductive devices 17 and 18 from one phase of the supply circuit 2 through a variable impedance means 38. The electronic discharge means 36 and 37 are preferably of the type employing an ionizable medium and each comprises a control member 39 which renders the electronic discharge means conductive. The electronic discharge means 36 and 37 are arranged so that means 37 follows the means 36; that is, electronic discharge means 36 upon conducting current renders electronic discharge means 37 conductive so that an even number of half cycles of current are transmitted to the primary windings 20 and 22.

In any inductive circuit, if the voltage is applied at an angle other than the power factor angle, a transient will occur. In peaking transformers in which an adjustable resistance is connected in series with one of the primaries, the magnitude of this transient voltage and the time required for it to disappear depend upon the value of the series resistance. If, for example, the voltage is applied to the auxiliary primary winding with the resistance shunted, the transient will be a maximum and will require the maximum time to disappear. The secondary winding will produce a peaked voltage but the phase of this peaked voltage will be earlier or later than the normal or intended voltage, depending upon the part of the alternating voltage wave at which excitation is applied to the primary winding. In order to have the secondary peaked voltage occur at the desired phase, as for example at the 90° point, and to be able to shift the peaked voltage in a leading direction, the value of the series resistance must be a minimum which corresponds to the maximum transient condition. The circuit shown in Fig. 1 is arranged to eliminate this transient voltage. In order to render the electronic discharge means 36 conductive at a predetermined time during the cycle of voltage which initiates the interval of energization and to reduce or prevent transient voltages in devices 17 and 18, I provide a saturable inductive device 40 having a primary winding 41 which is energized from the alternating current circuit 2 through a variable resistance 42 and having a secondary winding 43 in which there is induced an alternating voltage of peaked wave form. Of course, the electronic discharge means 36 is not rendered conductive until the anode-cathode circuit for electronic discharge means 36 is completed through the variable impedance means 38. A biasing or hold-off voltage is impressed on the control member 39 of electronic discharge means 36 by means of a transformer 44 which is continuously energized from the alternating current circuit 2. Suitable sources of negative biasing potential, such as self-biasing type circuits comprising capacitances 45 and resistances 46, may be connected in series relation with control members 39 of electronic discharge devices 36 and 37. A biasing or hold-off voltage is also impressed on control member 39 of electronic discharge means 37 by means of a transformer 47 which is energized from the circuit 2. I provide a feed-back transformer 48 having a primary winding 49 and a pair of secondary windings 50 and 51 for introducing in the excitation circuits for electronic discharge means 36 and 37, respectively, voltages to overcome the effect of the hold-off voltages supplied by transformers 44 and 47, respectively. The primary winding 49 of transformer 48 is connected to be energized from one phase of circuit 2 through the electronic discharge means 36 and 37 and, of course, is energized only when electronic discharge means 36 and 37 are conductive.

The variable impedance means 38 may comprise an adjustable resistance 52 having movable contacts 53, 54 and 55 and means for varying the effective impedance of the resistance 52, such as a pair of contacts 56 and 57. Where it is desired to effect a gradual change in the effective value of the resistance 52 and to obtain thereby a gradual shift in phase of the periodic control voltages, I provide an additional set of contacts 57a which shunt a small portion of the resistance 52. The effective or operating period of the variable impedance means 38 determines the interval of energization of the welding circuit 1, and the operation of the associated contact 57 determines the magnitude of the current transmitted to the welding circuit 1 during the interval of energization. The contacts 56 and 57 may be arranged to be closed by means of armatures 58 and 59, respectively, which in turn are operated by suitable means such as cams 60 and 61. The raised portion 60a of cam 60 establishes the period of energization of the welding circuit 1, and the portion 60b of cam 60 establishes the period of deenergization between the intervals of energization of circuit 1. Raised portions 61a and 61b of cam 61 determine the duration of the intervals of reduced current intensity of the interval of energization of welding circuit 1. Cams 60 and 61 may be driven by any suitable means, such as a direct current motor 62 having an armature 63 mechanically connected to the cams 60 and 61, and may have a field winding 64 and a rheostat 65 for controlling the speed of the motor 62 so that the cams 60 and 61 are driven in substantial synchronism with the voltage of circuit 2. It will thus be understood that the cams 60 and 61 constitute a means for preestablishing a predetermined pattern of current intensity to be transmitted to the welding circuit 1 during each interval of energization thereof.

The operation of the embodiment of my invention diagrammatically illustrated in Fig. 1 will be explained by considering the system when it is operating to transmit current to the welding circuit 1 during predetermined recurring intervals. That is, the welding circuit 1 is energized intermittently as in resistance seam welding operations. As is well understood by those skilled in the art, alternating current is transmitted to the welding circuit 1 when the electric valve means 12 and 13 are rendered conductive. The electric valve means 4 and 5 in turn are rendered conductive by the transmission of unidirectional impulses of current to the immersion ignitor control members 8. Such energization is effected when the electric valve means 12 and 13 are rendered conductive and the unidirectional impulses of current are transmitted from the supply circuit 2 through the control electric valve means 12 and 13 to the immersion ignitor control members 8.

The interval of energization or the duration of the interval of energization of welding circuit 1 is determined by the cam 60. The changes in the magnitude of the current transmitted to the welding circuit during each interval of energization is determined by the cam 61. Cams 60 and 61, of course, control the effective impedance connected in series relation with the electronic discharge means 36 and 37 and primary windings 20 and 22 of saturable inductive devices 17 and 18, and hence control of the voltage impressed on the control members 16 of the electric valve means 12 and 13.

Let it be assumed that the cams 60 and 61 are rotating in the direction indicated by the arrows. For the position of the cams shown in the figure no current is transmitted to the welding circuit 1 inasmuch as contacts 56 and 57 are in the open circuit position. For this condition, the electronic discharge means 36 and 37 are maintained nonconductive due to the alternating biasing voltages impressed on the control members 39 thereof by means of transformers 44 and 47, respectively. Of course, the alternating voltage of peaked wave form produced by the saturable inductive device 40 is present but, since the anode-cathode circuit of electronic discharge device 36 is open, no current will be supplied to primary windings 20 and 22. When the raised portions 60a and 61a of cams 60 and 61 engage the armatures 58 and 59, contacts 56 and 57 will be closed substantially simultaneously to connect in series relation resistance 52, electronic discharge means 36 and 37 and primary windings 20 and 22 of saturable inductive devices 17 and 18. The electronic discharge device 36 will not be rendered conductive until the desired point in the cycle of voltage of circuit 2 in order that the inductive devices be energized at the desired point in the cycle thereby reducing to a minimum the transient starting current and voltage in windings 23 and 24. By properly controlling the time of initiation of the interval of energization of the welding circuit 1, the transient starting current may be substantially eliminated. Of course, the angle at which energization should be initiated to eliminate the starting transient current is that angle corresponding to the power factor angle of the connected load. The saturable inductive device 40 produces an alternating voltage of peaked wave form to render the electronic discharge device 36 conductive at the desired time in the cycle of voltage of circuit 2 and transmits current to the primary windings 20 and 22 through resistance 52. Electronic discharge means 37 is rendered conductive by virtue of the voltage introduced into the excitation circuit therefor by means of secondary winding 51 of transformer 48, and the electronic discharge means 36 and 37 conduct current alternately for the interval of time established by the cam 60. Upon energization, the phase of the alternating voltages of peaked wave form produced by secondary windings 23 and 24 of saturable inductive devices 17 and 18 is shifted into the positive half cycles of applied anode-cathode voltage for electric valve means 4, 12 and 5, 13, respectively. It will be noted that so long as contact 57 is closed, the effective value of the resistance 52 is relatively small so that the phase of the alternating voltages of peaked wave form impressed on the control members 16 is substantially retarded with respect to the anode voltages to effect the transmission of a reduced amount of current to the welding circuit 1. After the lapse of a predetermined interval established by the raised portion 61a of cam 61, contact 57 is opened, effecting the insertion of an increased amount of resistance in series relation with primary windings 20 and 22, and thereby advancing the phase of the periodic voltages of peaked wave form impressed on control members 16 of control electric valve means 12 and 13. As a result thereof, the current transmitted to the welding circuit 1 is increased during the intermediate portion of the period of energization of welding circuit 1. This larger current is transmitted until the raised portion 61b of cam 61 engages the armature 59 to close contacts 57. The phase of the alternating voltages of peaked wave form impressed on control members 16 is again retarded in phase to effect a reduction in the current transmitted to the welding circuit at the end of the interval of energization. The period of deenergization of the welding circuit 1 is, of course, determined by the portion 60b of cam 60.

It will be noted that the energization of the inductive devices 17 and 18 is initiated in a manner to eliminate substantially the transient voltages in the secondary windings 23 and 24, in this manner effecting a precise control of the magnitude of the current transmitted to the welding circuit 1.

The operation of the arrangement of Fig. 1, particularly the manner in which the voltages impressed on the control members 16 of control electric valves 12 and 13 are shifted in phase in order to control the magnitude of the current transmitted to the welding circuit 1, may be better shown by referring to the operating characteristics shown in Figs. 2 and 3. Curve A of Fig. 2 diagrammatically illustrates the anode-cathode voltage of one group of main and control electric valve means, such as electric valve means 4 and the associated control electric valve means 12. Curve B represents the negative unidirectional biasing potential produced by rectifying circuit 29. When the primary winding 19 alone is energized, the voltage of peaked wave form produced by secondary winding 23 has the phase position indicated by curve C. When primary winding 20 is energized, the periodic voltage induced in secondary winding 23 is shifted to the positive half cycle of applied anode-cathode voltage. When both contacts 56 and 57 are closed, the alternating voltage of peaked wave form impressed on control members 16 has the phase position as indicated by curve D; and when only contact 56 is closed the alternating voltage of peaked wave form is advanced to the position indicated by curve E.

Diagram F of Fig. 3 illustrates the magnitude of the current transmitted to the welding circuit 1 during an interval of energization thereof. It will be noted that at the beginning and at the end of the interval, the current is reduced to a value substantially less than that obtained during the intermediate portion of the interval. Curve G represents the anode-cathode voltage applied to one of the power electric valves, such as electric valve means 4, and the shaded portion of this curve indicates the root-mean-square value of current transmitted to the load circuit 1 by this electric valve means. It will be noted that during the intermediate portion of the diagram a greater amount of current is transmitted than at the beginning or at the end of the interval. At time $d$ it may be considered that contacts 56 and 57 have been closed by cams 60 and 61, respectively, and that electronic discharge means 36 have been rendered conductive. Prior to this time the alternating voltages impressed on control members 16 have had the phase displacement corresponding to the positions of curve C of Fig. 2. When primary windings 20 and 22 are energized, the peaked voltage attains the phase position as indicated by curve D. At time e, contact 57 is opened effecting an advance in phase of the periodic voltages impressed on control members 16 to the position indicated by the curve E and effecting an increase in the current transmitted to the welding circuit 1. At time f, contact 57 is again closed effecting a retardation in phase of the voltage impressed on control members 16 to the position indicated by curve D, and at time g both contacts 56 and 57 are opened effecting deenergization of the welding circuit 1, and shifting the phase of the periodic voltage produced by windings 23 and 24 to the region of the negative half cycles of applied anode-cathode voltage as indicated by curve C.

The duration of the portion d—e of the energization interval of the welding circuit 1 may be controlled, of course, by the design of the raised portion 61a of cam 61 and likewise the duration of the portion of the interval f—g may be determined by the design of the raised portion 61b of this cam. The magnitude of the current transmitted to the load circuit during the intermediate portion e—f may be controlled by adjustment of the contacts 53 and 55 of resistance 52. For example, the magnitude of the current transmitted during the intermediate portion may be increased by increasing the effective resistance of element 52; and conversely the magnitude of the current transmitted to the welding circuit 1 may be decreased by reducing the value of this resistance. Furthermore, the rate of change of current during the intervals d—e and f—g may be determined by employing a plurality of contactors or an additional contact 57a or by use of a variable resistance in place of contacts 57 and 57a. The principle of operation, of course, involves the gradual change of the effective value of resistance 52 to determine the rate of phase advancement or retardation of the periodic voltage of peaked wave form furnished by windings 23 and 24 of saturable inductive reactances 17 and 18. For example, the resistance 52 may be controlled so that the current varies during the intervals d—e and f—g in the manner as indicated by lines H, J and K.

While Fig. 3 diagrammatically illustrates a control winding in which the current during the intervals d—e and f—g varies gradually, it is to be understood that the system may operate to produce a current characteristic in which the current during these intervals remains substantially constant, and is suddenly increased and decreased at times e and f, respectively.

Fig. 1a diagrammatically illustrates a modification of a portion of the control circuit shown in Fig. 1. More specifically, Fig. 1a illustrates the manner in which saturable inductive devices 17 and 18 may be combined into a single control device. Secondary windings 23 and 24 are placed on a single magnetic core structure 66 provided with two sets of magnetic shunts 67 and 68. Primary windings 19 and 20 serve the purposes of primary windings 19 and 20 in the arrangement of Fig. 1. The voltages induced in the secondary windings 23 and 24 are alternating and are of peaked wave form. Primary winding 20 is energized from control circuit 35 and primary winding 19 is continuously energized from one phase of circuit 2.

The embodiment of my invention shown in Fig. 1a operates in substantially the same manner as that explained above in connection with saturable inductive devices 17 and 18 of Fig. 1. Control circuit 35 variably energizes primary winding 20 to control the phase of the alternating voltages of peaked wave form induced in secondary windings 23 and 24 and hence controls the conductivities of control electric valves 12 and 13 and the power electric valves 4 and 5.

Fig. 4 diagrammatically illustrates another embodiment of my invention which is similar in many respects to that shown in Fig. 1, and corresponding elements have been assigned like reference numerals. In the arrangement of Fig. 4, the period of energization of the welding circuit 1 is determined by the cam 69, and the shift in phase of the periodic voltage of peaked wave form impressed on the control members 16 to control the current transmitted to the welding circuit during each interval of energization is determined by a cam 70. Contacts 71 and 72 are connected in circuits 73 and 74 which shunt secondary windings 23 and 24 of saturable inductive devices 17 and 18 through current-suppressing resistances 75 and 76, respectively. When the contacts 71 and 72 are in the open position, the voltages of peaked wave form are impressed on the control member 17 and control electric valves 12 and 13 and the associated power electric valves 4 and 5 are rendered conductive to energize the welding circuit 1. The depressed portion 69a of the cam 69 established the duration of the period of energization of the welding circuit 1, and the raised portion 69b, of course, established the interval between the periods of energization. Cam 70 operates contactor 71 and variably energizes primary windings 20 and 22 of saturable inductive devices 17 and 18 to control the phase of the voltage impressed on control members 16. The arrangement of my invention shown in Fig. 4 effects intermittent energization of the welding circuit 1 and controls the duration of each period of energization. Furthermore, the arrangement may operate to control the current transmitted to the welding circuit during each interval of energization to effect the type of control characterized by the curves shown in Figs. 2 and 3. That is, the current is increased during the first part of the period of energization and is decreased near the end.

At the time indicated by the position of the cams shown in Fig. 4, no current is being transmitted to the welding circuit 1. A short time thereafter, contactors 71 and 72 are opened, permitting the alternating voltages of peaked wave form to render electric valves 12 and 13 conductive. Contactor 71 does not open until after contactors 71 and 72 are opened, so that the current transmitted to the welding circuit 1 does not increase to the intermediate value until time e shown in Fig. 3. At time e, contactor 71 is opened, increasing the effective resistance of element 52 and advancing in phase the alternating voltages of peaked wave form furnished by windings 23 and 24. It will be noted that the system of Fig. 4 may operate to produce a current characteristic similar to that shown in Fig. 3.

It will be noted that during the period when contacts 71 and 72 are closed, the negative unidirectional biasing potential supplied by rectifiers 29 and 30 maintains control electric valves 12 and 13 in a nonconductive condition. In addition, it is emphasized that the damping resistances 75 and 76 absorb a predetermined amount of energy to prevent transient voltages being impressed on control members 16. In this manner a positive and precise control of the amount of current transmitted at the beginning and at the end of the welding interval may be effected.

It is emphasized that in the arrangements of Figs. 1 and 4 the welding circuit 1 is energized from one phase of the polyphase alternating current circuit 2 through the reversely connected electric valve means 4 and 5; and it will also be noted that primary windings 20—22 of the saturable inductive devices 17 and 18 are energized from another phase of the polyphase circuit 2. The advantage of this type of connection will be understood when it is considered that in saturable inductive devices the phase shift obtainable is substantially 180 electrical degrees and, as illustrated in Fig. 2, it is important to obtain this phase shift of the alternating voltages of peaked wave form throughout a region extending from approximately 120 electrical degrees lagging phase displacement to approximately 30 electrical degrees leading phase displacement. These requirements are met by utilizing the pair of primary windings energized in the manner explained above and by connecting these primary windings to be energized from a phase different from that which energizes the welding circuit. The large phase shift is obtained by the manner in which control windings 19 and 20 and 21 and 22 are energized in opposition and the region of the phase shift is obtainable by energizing these windings from a different phase of the polyphase supply circuit or from voltage sources having a corresponding phase displacement.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current supply circuit, a load circuit, electric translating apparatus connected between said circuits and comprising an electric valve means for controlling the energization of said load circuit, means comprising a device for producing a periodic voltage of the same periodicity as that of said source and adjustable in phase to control said electric valve means and to effect energization of said load circuit during each cycle of voltage of said supply circuit during a predetermined interval of time, means for pre-establishing a predetermined pattern of current intensity to be transmitted to said load circuit during said interval, and means responsive to the pattern determining means for controlling said device to shift the phase of said periodic voltage to transmit different amounts of current to said load circuit during different predetermined portions of said interval.

2. In combination, an alternating current supply circuit, a load circuit, electric translating apparatus connected between said circuits and comprising electric valve means for controlling the energization of said load circuit, said electric valve means having a control member for controlling the conductivity thereof, means including saturable inductive means for impressing on said control member a periodic voltage of the same frequency as the frequency of said supply circuit to render said electric valve means conductive during each cycle of voltage of said supply circuit during a predetermined interval of time, means for pre-establishing a predetermined pattern of current intensity to be transmitted to said load circuit during said interval, and means responsive to the pattern determining means for controlling said saturable inductive means to shift the phase of said periodic voltage throughout at least a portion of said interval of time to transmit different amounts of current to said load circuit during different predetermined portions of said interval.

3. In combination, an alternating current supply circuit, a load circuit, electric valve means for controlling the energization of said load circuit and comprising a control member for controlling the conductivity thereof, means for impressing on said control member a periodic voltage of the same periodicity as said supply circuit to render said electric valve means conductive during each cycle of voltage of said supply circuit during a predetermined interval of time, means for pre-establishing a predetermined pattern of current intensity to be transmitted to said load circuit during said interval, and means responsive to the pattern determining means for controlling the phase of said periodic voltage throughout at least a portion of said interval of time to transmit different amounts of current to said load circuit during different predetermined portions of said interval.

4. In combination, an alternating current supply circuit, a load circuit, electric valve means for controlling the energization of said load circuit and comprising a control member for controlling the conductivity thereof, means for impressing on said control member a periodic voltage of the same periodicity as said supply circuit to render said electric valve means conductive during each cycle of voltage of said supply circuit during a predetermined interval of time, means for pre-establishing a predetermined pattern of current intensity to be transmitted to said load circuit during said interval, and means responsive to the pattern determining means for controlling the phase of said periodic voltage throughout portions of said predetermined interval of time to transmit smaller amounts of current to said load circuit near the beginning and at the end of said interval of time than is transmitted during the intermediate portion of said interval.

5. In combination, an alternating current supply circuit, a load circuit, electric valve means for controlling the energization of said load circuit and comprising a control member for controlling the conductivity thereof, means for impressing on said control member a periodic voltage of the same periodicity as the voltage of said supply circuit to render said electric valve means conductive during each cycle of voltage of said supply circuit during a predetermined interval of time, means for pre-establishing a predetermined pattern of current intensity to be transmitted to said load circuit during said interval, and means responsive to the pattern determining means for advancing the phase of said periodic voltage near the beginning of said interval to increase the current transmitted to said load circuit and for retarding the phase of said periodic voltage near the end of said interval to decrease the current transmitted to said load circuit.

6. In combination, an alternating current supply circuit, a load circuit, electric valve means for controlling the energization of said load circuit and comprising a control member for controlling the conductivity thereof, means for impressing on said control member a periodic voltage of the same periodicity as the voltage of said supply circuit to render said electric valve means conductive during each cycle of voltage of said supply circuit during a predetermined interval of time, means for pre-establishing a predetermined pattern of current intensity to be transmitted to said load circuit during said interval, and means responsive to the pattern determining means for controlling the phase of said periodic voltage throughout a predetermined portion of said interval of time to increase the current transmitted to said load circuit during a portion of said interval of time.

7. In combination, an alternating current supply circuit, a load circuit, electric valve means for controlling the energization of said load circuit and comprising a control member for controlling the conductivity thereof, means for impressing on said control member a periodic voltage of the same periodicity as the voltage of said supply circuit to render said electric valve means conductive during each cycle of voltage of said supply circuit during a predetermined interval of time, means for pre-establishing a predetermined pattern of current intensity to be transmitted to said load circuit during said interval, and means responsive to the pattern determining means for controlling the phase of said periodic voltage to transmit to said load circuit during the first cycle of said interval a different amount of current than is transmitted to said load circuit during subsequent half cycles.

8. In combination, an alternating current supply circuit, a load circuit, electric valve means for controlling the energization of said load circuit and comprising a control member for controlling the conductivity thereof, means for impressing on said control member a periodic voltage of the same periodicity as the voltage of said supply circuit to render said electric valve means conductive during each cycle of voltage of said supply circuit during a predetermined interval of time, means for pre-establishing a predetermined pattern of current intensity to be transmitted to said load circuit during said interval, and means responsive to the pattern determining means for controlling the phase of said periodic voltage to increase the current transmitted to said load circuit from one predetermined value to a second predetermined value.

9. In combination, an alternating current supply circuit, a load circuit, electric valve means for controlling the energization of said load circuit and comprising a control member for controlling the conductivity thereof, means for impressing on said control member a periodic voltage of the same periodicity as the voltage of said supply circuit to render said electric valve means conductive during each cycle of voltage of said supply circuit during the predetermined interval of time, means for pre-establishing a predetermined pattern of current intensity to be transmitted to said load circuit during said interval, and means responsive to the pattern determining means for shifting the phase of said periodic voltage to increase gradually the current transmitted to said load circuit from one predetermined value to a second predetermined value.

10. In combination, an alternating current supply circuit, a load circuit, electric translating apparatus connected between said circuits and comprising electric valve means for controlling the energization of said load circuit, said electric valve means having a control member for controlling the conductivity thereof, a saturable inductive device energized from said supply circuit for impressing on said control member a periodic voltage of peaked wave form, means for energizing said saturable inductive device for a predetermined interval of time to effect energization of said load circuit during a corresponding interval of time, means for initiating the energization of said inductive device at a predetermined time relative to the voltage of said supply circuit to eliminate transient voltages in said inductive device, and means for controlling the magnetization of said inductive device to effect an advance in phase of said periodic voltage from one predetermined phase displacement relative to the voltage of said supply circuit to a second predetermined phase displacement.

11. In combination, an alternating current supply circuit, a load circuit, electric translating apparatus connected between said circuits and comprising electric valve means for controlling the energization of said load circuit, said electric valve means including a control member for controlling the conductivity thereof, a saturable inductive device including a primary winding and having a secondary winding for impressing on said control member a periodic voltage of peaked wave form, means for energizing said primary winding to effect energization of said load circuit for a predetermined interval of time, electronic discharge means connected in circuit with said primary winding to control the energization thereof, and means for controlling said electronic discharge means to effect energization of said primary winding at a time relative to the voltage of said supply circuit to avoid establishment of transient voltages in said secondary winding.

12. In combination, an alternating current supply circuit, a load circuit, electric translating apparatus connected between said circuits and including an electric valve means for controlling the energization of said load circuit, said electric valve means having a control member for controlling the conductivity thereof, a saturable inductive device having a primary winding and having a secondary winding for impressing on said control member a periodic voltage of peaked wave form, and means comprising variable impedance means and a timing device connected in circuit with said primary winding for effecting energization of said load circuit for a predetermined interval of time.

13. In combination, an alternating current supply circuit, a load circuit, electric translating apparatus connected between said circuits and including an electric valve means for controlling the energization of said load circuit, said electric valve means having a control member for controlling the conductivity thereof, a saturable inductive device having a primary winding and having a secondary winding for impressing on said control member a periodic voltage of peaked wave form, means comprising a timing device connected in circuit with said primary winding for effecting energization of said load circuit during a predetermined interval of time, and means for varying the amount of current transmitted to said load circuit during said interval of time.

14. In combination, an alternating current supply circuit, a load circuit, electric translating apparatus connected between said circuits and comprising electric valve means for controlling the energization of said load circuit, said electric valve means having a control member for controlling the conductivity thereof, a saturable inductive device having a pair of primary windings and a secondary winding, said secondary winding being connected to impress a periodic voltage of peaked wave form on said control member, means for energizing one of said primary windings from said supply circuit, and means for transmitting variable amounts of alternating current to the other of said primary windings from said supply circuit to effect variation in phase of said periodic voltage with respect to the voltage of said supply circuit.

15. In combination, an alternating current supply circuit, a load circuit, electric translating apparatus connected between said circuits and comprising electric valve means for controlling the energization of said load circuit, said electric valve means having a control member for controlling the conductivity thereof, a saturable inductive device having a pair of primary windings and a secondary winding, said secondary winding being connected to impress a periodic voltage of peaked wave form on said control member, means for supplying alternating current to one of said primary windings from said supply circuit, and variable impedance means connected between said supply circuit and the other of said primary windings thereby varying the amount of alternating current transmitted thereto and to effect control of the phase of said periodic voltage with respect to the voltage of said supply circuit.

16. In combination, an alternating current supply circuit, a load circuit, electric translating apparatus connected between said circuits and comprising electric valve means for controlling the energization of said load circuit, said electric valve means having a control member for controlling the conductivity thereof, a saturable inductive device having a pair of primary windings and a secondary winding, said secondary winding being connected to impress a periodic voltage of peaked wave form on said control member, means for energizing one of said primary windings from said supply circuit, and a pair of reversely connected electronic discharge means connected between said supply circuit and the other of said primary windings for controlling the phase of said periodic voltage.

17. In combination, an alternating current supply circuit, a load circuit, electric translating apparatus connected between said circuits and comprising electric valve means for controlling the energization of said load circuit, said electric valve means having a control member for controlling the conductivity thereof, a saturable inductive device having a pair of primary windings and a secondary winding, said secondary winding being connected to impress a periodic voltage of peaked wave form on said control member, means for energizing one of said primary windings from said supply circuit, and means connected between said supply circuit and the other of said primary windings comprising in series relation a pair of reversely connected electronic discharge means and a variable impedance device to effect energization of said load circuit during a predetermined interval of time and for varying the magnitude of the current transmitted to said load circuit during said interval of time.

18. In combination, an alternating current circuit, a load circuit, electric translating apparatus connected between said circuits and comprising an electric valve means having a control member for controlling the conductivity thereof, a saturable inductive device having a secondary winding for impressing on said control member a periodic voltage of peaked wave form and having a pair of primary windings, one of said primary windings being continuously energized from said supply circuit, means connected across said secondary winding for controlling the number of impulses of said periodic voltage impressed on said control member to energize said load circuit for a corresponding interval of time, and means for variably energizing the other of said primary windings to control the phase of said periodic voltage during said interval of time.

19. In combination, an alternating current circuit, a load circuit, electric translating apparatus connected between said circuits and comprising an electric valve means having a control member for controlling the conductivity thereof, a saturable inductive device having a secondary winding for impressing on said control member a periodic voltage of peaked wave form and having a pair of primary windings, one of said primary windings being continuously energized from said supply circuit, means connected across said secondary winding for controlling the number of impulses of said periodic voltage impressed on said control member to energize said load circuit for a corresponding interval of time, and variable impedance means connected in circuit with the other of said primary windings to control the phase of said periodic voltage during said interval of time.

20. In combination, a polyphase alternating current supply circuit, a load circuit, electric translating apparatus connected between one phase of said polyphase circuit and said load circuit and comprising electric valve means for controlling the energization of said load circuit, said electric valve means having an anode, a cathode and a control member for controlling the conductivity thereof, a saturable inductive device connected to be energized from a different phase of said supply circuit, and means for controlling said saturable inductive device to effect a shift in phase of said periodic voltage relative to the voltage of said one phase from a substantially leading position with respect to the applied positive half-cycle of anode-cathode voltage of said electric valve means to a lagging position within the region of the positive half cycle of applied anode-cathode voltage.

21. In combination, an alternating current supply circuit, a load circuit, electric translating apparatus connected between said circuits and including an electric valve means for controlling the energization of said load circuit, said electric valve means having a control member for controlling the conductivity thereof, a saturable inductive device having a primary winding and having a secondary winding for impressing on said control member a periodic voltage of peaked wave form, and means for effecting energization of said load circuit for a predetermined interval of time comprising a timing device connected in circuit with said primary winding.

22. In combination, an alternating current supply circuit, a load circuit, electric valve means for controlling the energization of said load circuit and comprising a control member for controlling the conductivity thereof, means for impressing on said control member a periodic voltage of the same periodicity as said supply circuit to render said electric valve means conductive during cycles of voltage of said supply circuit during a predetermined interval of time, means for pre-establishing a predetermined pattern of current intensity to be transmitted to said load circuit during said interval including impedance means, means for adjusting said impedance means to establish the current levels of the different portions of said pattern, and means responsive to the pattern determining means for controlling said periodic voltage throughout at least a portion of said interval of time to change the instant of initiation of conduction of said electric valve means and thereby to transmit different amounts of current to said load circuit during different predetermined portions of said interval.

23. In combination, an alternating current supply circuit, a load circuit, electric valve means for controlling the energization of said load circuit and comprising a control member for controlling the conductivity thereof, means for impressing on said control member a periodic voltage of the same periodicity as said supply circuit to render said electric valve means conductive during cycles of voltage of said supply circuit during a predetermined interval of time, timing means for determining said interval means for pre-establishing a predetermined pattern of current intensity to be transmitted to said load circuit during said interval, and means responsive to the pattern determining means for modifying said periodic voltage during said predetermined interval of time to transmit smaller amounts of current to said load circuit near the beginning and at the end of said interval of time than is transmitted during an intermediate portion of said interval.

24. In combination, an alternating current supply circuit, a load circuit, electric valve means for controlling the energization of said load circuit and comprising a control member for controlling the conductivity thereof, means for impressing on said control member a periodic voltage of peaked wave form including a saturable inductive device, means for controlling the energization of said device to establish a plurality of different phase positions of said periodic voltage of peaked wave form including impedance means, switching means for controlling the effective magnitude of said impedance means, and timing means for controlling said switching means selectively to establish the cycles of said supply circuit voltage during which said periodic voltage has each of said phase positions thereby to transmit different finite magnitudes of current to said load circuit.

25. In combination, an alternating current supply circuit, a load circuit, electric valve means for controlling the energization of said load circuit and comprising a control member to control the conductivity thereof, means for producing a periodic voltage including a transformer, means for controlling the energization of said transformer to establish a plurality of different phase positions of said periodic voltage corresponding to different current levels to be supplied to said load circuit including a plurality of resistance sections at least part of which are adjustable to adjust the corresponding current level, switching means for controlling the connection of said resistance sections with said transformer, and timing means for controlling the energization of said control member to establish an interval during which said load circuit is energized and for selectively controlling said switching means to effect the transmission of different levels of current to said load circuit during different preselected portions of said interval.

GEORGE W. GARMAN.